(12) United States Patent
Viola

(10) Patent No.: US 10,214,257 B1
(45) Date of Patent: Feb. 26, 2019

(54) DEVICE FOR PLACING AND REPLACING VEHICLE GLASS

(71) Applicant: VBSA, Cornimont (FR)

(72) Inventor: Cedric Viola, Saulxures sur Moselotte (FR)

(73) Assignee: VBSA, Cornimont (FR)

( * ) Notice: Subject to any disclaimer, the term of this patent is extended or adjusted under 35 U.S.C. 154(b) by 69 days.

(21) Appl. No.: 15/666,851

(22) Filed: Aug. 2, 2017

(30) Foreign Application Priority Data

Aug. 2, 2017 (FR) .................................... 16 57501

(51) Int. Cl.
*H01L 21/683* (2006.01)
*B62D 65/06* (2006.01)
*B25B 11/00* (2006.01)

(52) U.S. Cl.
CPC ............ *B62D 65/06* (2013.01); *B25B 11/005* (2013.01)

(58) Field of Classification Search
CPC ........ B25B 11/00; B25B 11/02; B25B 11/005
See application file for complete search history.

(56) References Cited

U.S. PATENT DOCUMENTS

| 2004/0003488 A1 | 1/2004 | Thompson |
| 2010/0011554 A1 | 1/2010 | Daigle |

*Primary Examiner* — Lee D Wilson
(74) *Attorney, Agent, or Firm* — Craft Chu PLLC; Andrew W. Chu

(57) ABSTRACT

The device for placing and replacing a window of a motor vehicle, such as a windshield, includes a support beam formed by a post. The lower end is fastened on a base, while the upper end is secured to a beam rotating around the axis of the post. A set of suction cups is secured to a bar, and there are means for suspending the bar from the beam and means for adjusting the height of the bar suspended from the beam. The device can include a means for temporarily securing the bar to the post. The suction cups are mounted rotating on the bar around the axis of the bar and around an axis perpendicular to the axis of the bar.

11 Claims, 5 Drawing Sheets

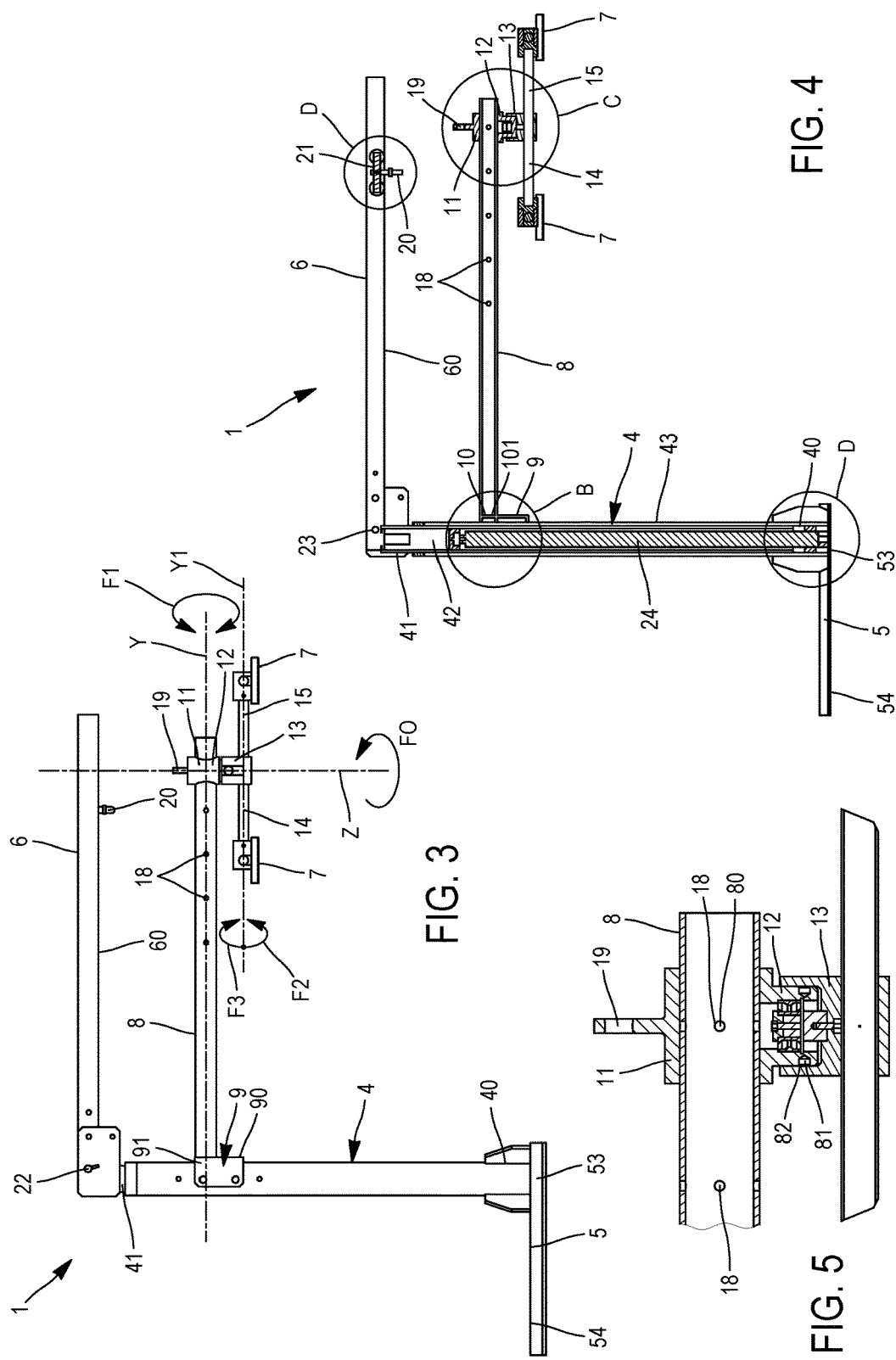

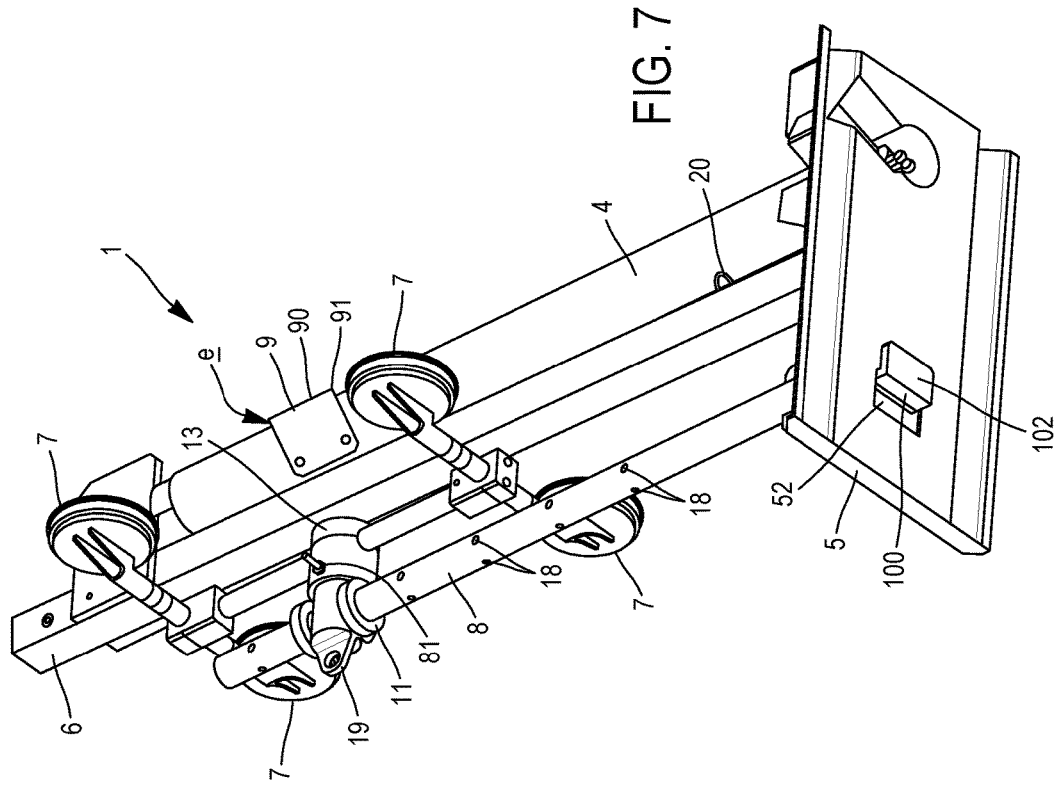
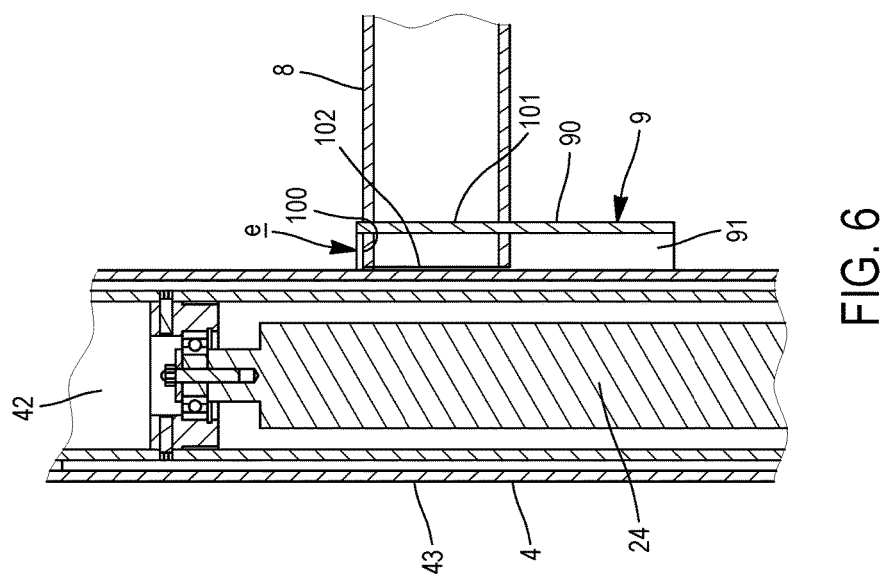

DEVICE FOR PLACING AND REPLACING VEHICLE GLASS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a device for placing or depositing a window of a motor vehicle, such as a windshield, including a support beam formed by a post whereof the lower end is fastened on the base and the upper end is secured to a beam rotating around the axis of said post, on the one hand, and a set of suction cups secured to a bar as well as means for suspending said bar from said beam and means for adjusting the height of said bar suspended from said beam, on the other hand.

2. Description of Related Art Including Information Disclosed Under 37 CFR 1.97 and 37 CFR 1.98

Traditionally, such a device is intended to allow an operator to perform, alone, all of the operations related to assembling or disassembling a window of a motor vehicle, for example a windshield, a rear windshield, a sunroof window or any other motor vehicle window, while exerting the smallest amount of physical effort possible, completely safely and precisely.

It has been observed that devices of this type currently available to professionals are not always fully satisfactory. Indeed, given that they are generally stored as spare parts or folded into a storage position, some of them may assume many manual operations by the operator in order to assemble the various component elements, some of which are relatively heavy, then successive tedious and time-consuming adjustments intended to place these elements in a configuration in which the device is suited both to the type of vehicle and window, and to the operator's needs. This has the drawback of requiring both a considerable preparation time and non-negligible physical efforts by the technician, additionally with a result that is not always satisfactory.

Furthermore, it is proven that using such devices does not make it possible to fully offset the tedious nature of the assembly or disassembly operations for the window in question. The efforts that must be made by the operator remain excessive, in particular to accompany the window in the various changes of position that it may undergo to be assembled or disassembled.

Thus for example, during assembly, the window must be turned over after the suction cups are attached, in particular to allow the application of glue and/or to bring it, via several additional pivoting operations along different axes, into an appropriate position across from the frame defining the housing inside which it must be installed in the vehicle in question.

The structure of the devices currently used to assemble or disassemble a window of a motor vehicle does not allow the automated and quasi-automated performance of these various steps necessary for the desired positioning of said window, either relative to the vehicle or relative to a storage location. These steps therefore necessarily assume a substantial physical investment by the operator, who, although the window is suspended from the support beam during at least some of the steps, must nevertheless still maneuver it repeatedly to pull or push it in the various required directions. As a result, many operators may be led to exert excessive physical force and often ultimately experience back pain.

In order to at least partially resolve this problem, it is common to use a turning table in addition to a motor vehicle window placement or depositing device as described in the preamble. The latter allows an operator to eliminate at least some of the difficulties related to the step of turning the window over. Nevertheless, such a solution involves an additional financial investment for the motor vehicle window repair company. Furthermore, it also has the drawback of increasing the overall bulk of the placement and deposition device, requiring having a large work or storage area, which may be problematic in small workshops, in particular located in a downtown area.

BRIEF SUMMARY OF THE INVENTION

The present invention consequently aims to offset the various aforementioned drawbacks by proposing a device for placing and depositing a motor vehicle window that is able to bear the weight of said window and also, preferably automatically, performs all of the steps necessary for appropriate positioning of said window in the desired location, such that a single operator is able to perform the assembly or disassembly alone, without having to exert a physical effort to that end, such that his back is preserved. Moreover, another aim of the invention is also to provide a solution to reduce the cost of such a device as well as its bulk, so as to make it easier to store and easy to implement in a space potentially having a limited size.

In order to achieve the aims set out above, the present invention proposes a device for placing and depositing a motor vehicle window, such as a windshield, of the type indicated in the preamble, characterized in that it includes means for temporarily securing said bar to said post and in that said suction cups are mounted rotating on said bar around the axis of said bar and around an axis perpendicular to the axis of said bar.

Other features and advantages of the invention will emerge from the following detailed description relative to one embodiment of the device for placing and depositing a motor vehicle window according to the invention given solely for information and non-limitingly.

BRIEF DESCRIPTION OF THE SEVERAL VIEWS OF THE DRAWINGS

The understanding of this description will be facilitated in reference to the attached drawings.

FIG. 3 is a side elevation view of the device of FIG. 1, in which the upper segment of the telescoping post is retracted in the lower segment.

FIG. 4 is a sectional view of the device of FIG. 3.

FIG. 5 is an enlarged sectional view of detail C of FIG. 4.

FIG. 6 is an enlarged sectional view of detail B of FIG. 4.

FIG. 7 is a perspective view of the device according to the invention in the storage position.

DETAILED DESCRIPTION OF THE INVENTION

In the alternative embodiment shown in the figures, the device 1 according to the invention for placing or depositing a window, in particular a windshield of a motor vehicle, traditionally includes a support beam made from a metal material, for example aluminum or a material having equivalent properties.

Figure 8:
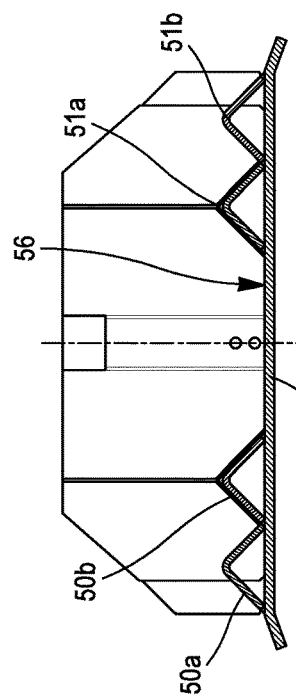
FIG. 8 shows a sectional view along A-A that includes the device of FIG. 1.
Figure 13:
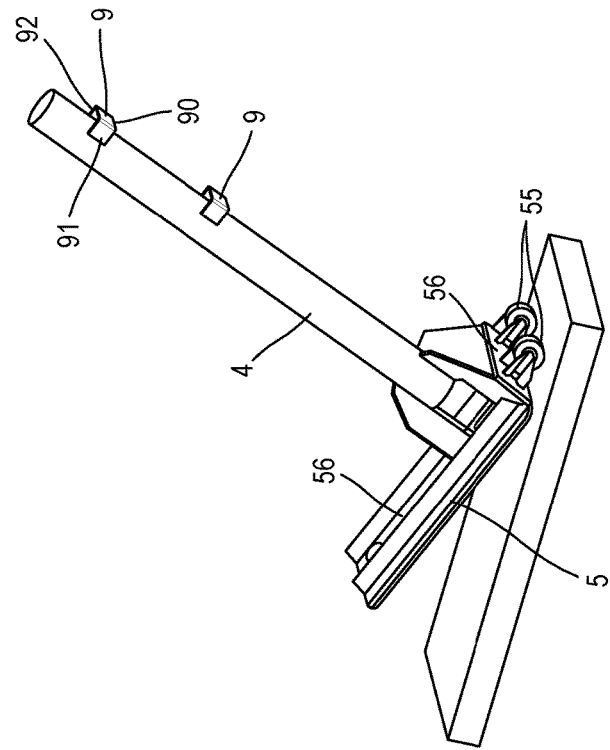
FIGS. 12 and 13 show partial perspective views of one alternative embodiment of the device in which the base is provided with a pair of casters, respectively in the usage position of the device and in the movement position of the device along a floor.
Figure 12:
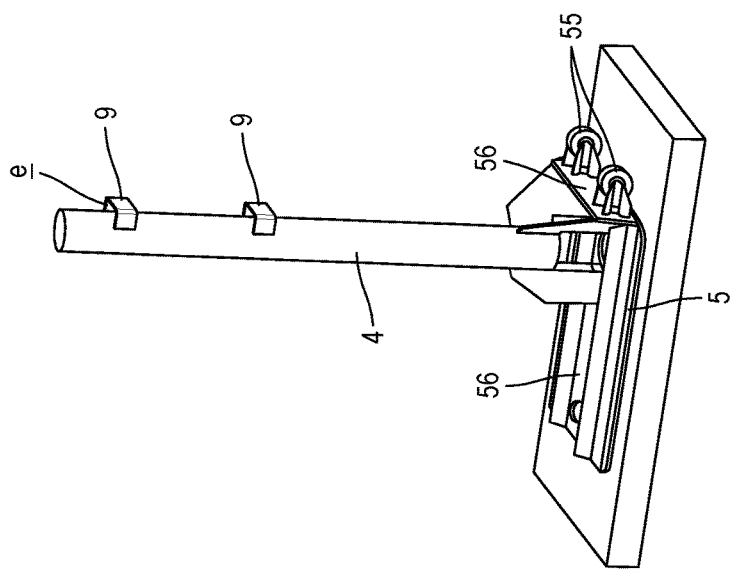

It is made up of a tubular post 4 whereof the lower end 40 is fastened, preferably removably, or if applicable of the fixed type, for example by welding, on a face including a plate 5, preferably in a single piece, intended to rest on the ground. It should be noted that the base is preferably equipped with at least one pair of casters 55 (cf. FIGS. 12 and 13) preferably fixed on a side face 56 extending on the side of the post 4, perpendicular to the plate 5, so as to facilitate the movement of the device according to the invention. The plate 5 is able to form an L-shaped structure with the post 4, on which a vehicle tire can bear when the device 1 is implemented in order to block the latter in position during steps for assembling or disassembling the windshield. When the considered tire of the vehicle is positioned on the plate 5, it is in turn wedged between two opposite edges 50, 51 of the plate 5, said edges 50, 51 forming one or several beads 50a, 50b, 51a, 51b (cf. FIG. 8) relative to the bottom of the plate 5, and consequently means for wedging said tire.

The support beam also includes a beam 6, mounted rotating 360° around the axis X of said post 4, on the upper end 41 of the latter. During the use of the device 1, the beam 6 extends along an axis perpendicular to the axis X of the post 4. Furthermore, in this usage position, the beam 6 is provided to be able to adopt different positions, including a first position in which it extends from the post 4 toward a direction opposite that toward which the plate 5 extends (cf. FIGS. 1-4), and a position (not shown) in which it extends from the post 4 toward the same direction as the plate 5, and is then situated above the latter.

Furthermore, the device 1 according to the invention also traditionally includes a set of four suction cups 7 secured to a bar 8, as well as means for suspending the latter from the beam 6 and means for adjusting the height of the bar 8 when it is suspended from the beam 6 that will be described in more detail below.

The invention also sets out that the device 1 includes means for temporarily securing the bar 8 to the post 4, such that it extends perpendicular to the latter below the beam 6 placed in the first position set out above (FIGS. 1 to 4). Furthermore, the suction cups 7 are mounted rotating on the bar 8 around the axis Y of the bar 8 and around an axis Z perpendicular to the axis Y of the bar 8 (cf. FIGS. 1 and 2).

As will emerge more clearly from the description that will be provided below of the implementation of the device 1 according to the invention, such a feature makes it possible to have a turning table that is an integral part of the device 1 when the bar 8 is fastened on the post 4. Thus, during his operation, the technician advantageously benefits from the assistance of a turning table, based on a bulk corresponding only to that of the support beam and therefore making it possible to perform the various steps to assemble or disassemble a motor vehicle window in the smallest possible space.

In the alternative embodiment shown in the figures, the means for temporarily securing the bar 8 to the post 4 include a first U-shaped platen 9 having a front wall 90 and two opposite side walls 91 fastened to the post 4 so as to arrange a space e between the front wall 90 and the post 4 (cf. FIGS. 6 and 7), and a second U-shaped platen 10 having an upper wall 100 and two opposite side walls 101, 102, one of which, here the wall 101, is fastened to one end of the bar 8 (cf. FIGS. 2, 4, 6, 7 and 9). Furthermore, the inner face of the front wall 90 of the first platen 9 and the free side face 102 of the second platen 10 are provided with complementary nesting means. The latter can for example be defined by a slot formed in the inner face of the front wall 90 of the first platen 9 with an appropriate width to allow the nesting of the free side wall 102 of the second platen 10 connected to the bar 8 therein. In other words, the first U-shaped platen 9 forms a housing secured to the post 4 serving to receive the free wall 102 of the second U-shaped platen 10 of the bar 8, in order to attach the bar 8 removably on said post 4. This housing may simply be defined by the space e extending between the front wall 90 of the platen 9 and the post 4 or by this space and a slot formed in the inner face of the front wall 90 of the platen 9.

In short, the bar 8 may be temporarily secured to the post 4 very quickly by attaching the second platen 10 on the first platen 9, by simply inserting the free side wall 102 of the second platen 10 into the free space e comprised between the post 4 and the front wall 90 of the first platen 9 and sliding this same side wall 102 toward the plate 5 in the slot optionally included in the inner face of the front wall 90 of the first platen 9. Likewise, the bar 8 and the post 4 can be separated very quickly and with no tools by simply removing the free side wall 102 of the second platen 10 secured to the bar 8 from the slot included by the space e extending between the first platen 9 secured to the post 4 and the latter.

Figure 9:
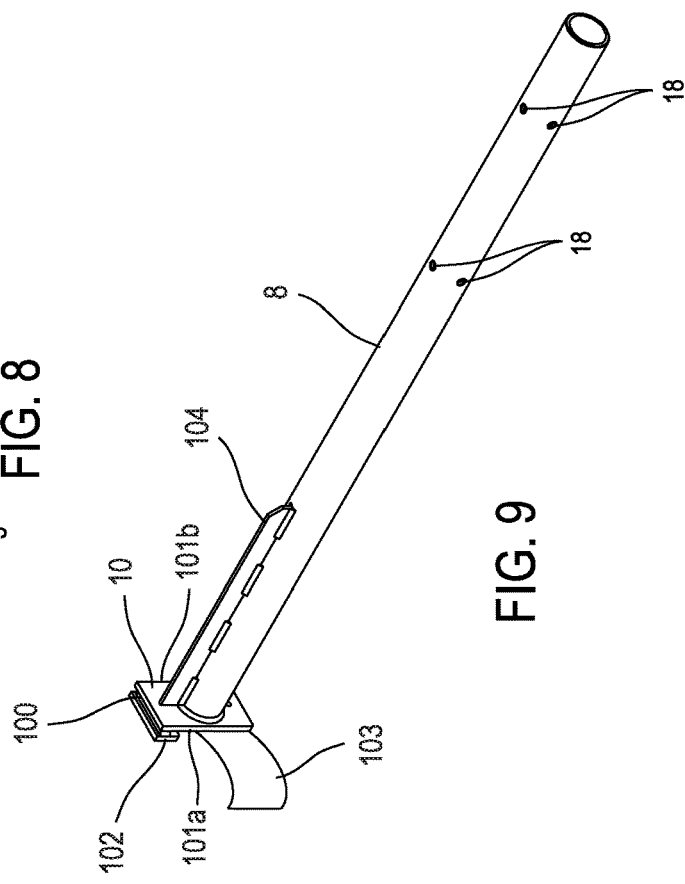
FIG. 9 is a perspective view of an alternative embodiment of the bar of the device according to the invention.

In the alternative embodiment of the bar 8 illustrated in FIG. 9, the second platen 10 additionally includes two wings 103, extending the opposite side edges 101a, 101b of its side wall 101. These wings 101a, 101b are configured (here, they are bowed) and sized such that they can marry the peripheral wall of the post 4, near the first platen 9, the first time the bar 8 is attached on the latter. The two wings 101a, 101b thus serve as guide means for the operator performing this maneuver, which thus becomes easier and faster. It should be noted that in the alternative, the bar 8 also includes a reinforcing fin 104 extending along its outer wall in a plane parallel to its axis Y, over a certain length from the second platen 10.

Furthermore, according to another alternative embodiment (shown in FIGS. 12 and 13) of the device according to the invention, the post 4, then having an appropriate length, can be equipped with several platens 9, for example two platens 9, fastened at different heights. This makes it possible to broaden the usage field of the device according to the invention, which may then be considered in the context of replacing windshields for light vehicles, as well as utility vehicles, for example.

In the alternative embodiment shown in FIGS. 1-5 and 7, the suction cups 7 of the device 1 according to the invention are connected to the bar 8 using a T-shaped sleeve 11 with which the latter is equipped. Advantageously, the T-shaped sleeve 11 is mounted rotating 360° around the axis Y of the bar 8 and translatable along this axis Y.

Furthermore, the sleeve 11 is able to be blocked in position relative to the bar 8, for example using an indexing finger 80 cooperating with a hole chosen from among a plurality of holes 18 extending along and around the bar 8.

Figure 1:
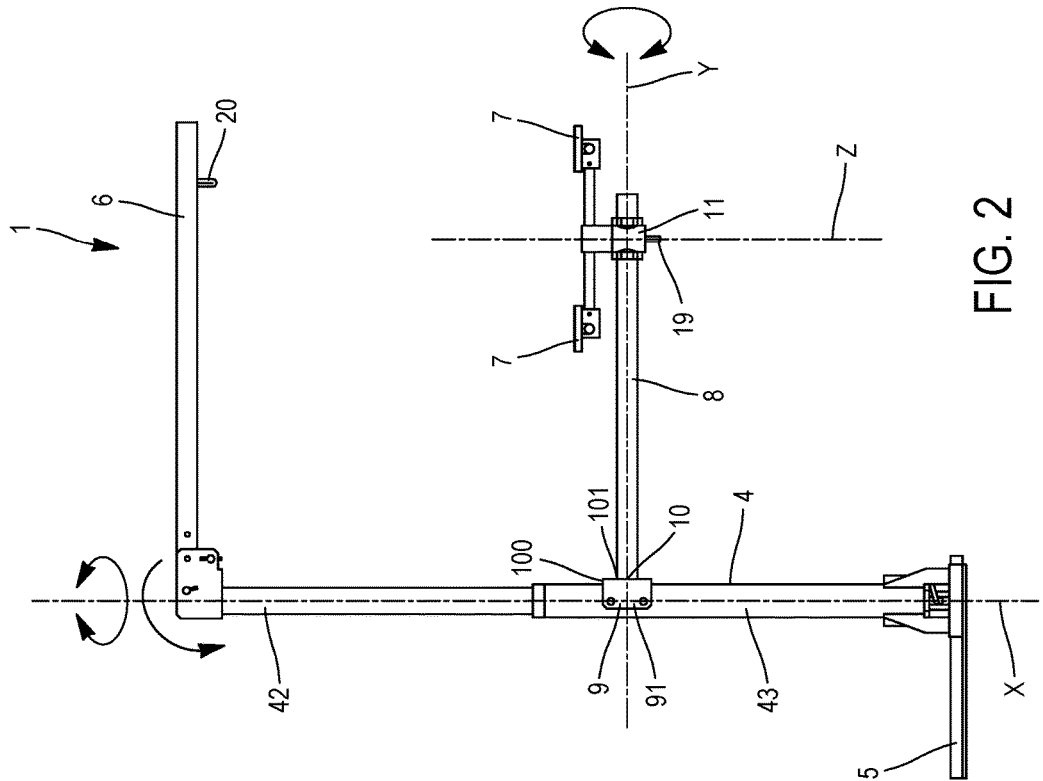
FIG. 1 is a perspective view of a device according to the invention in the usage position, in which the upper segment of the telescoping post is completely deployed relative to the lower segment, and the set of suction cups is oriented toward the ground.
Figure 2:
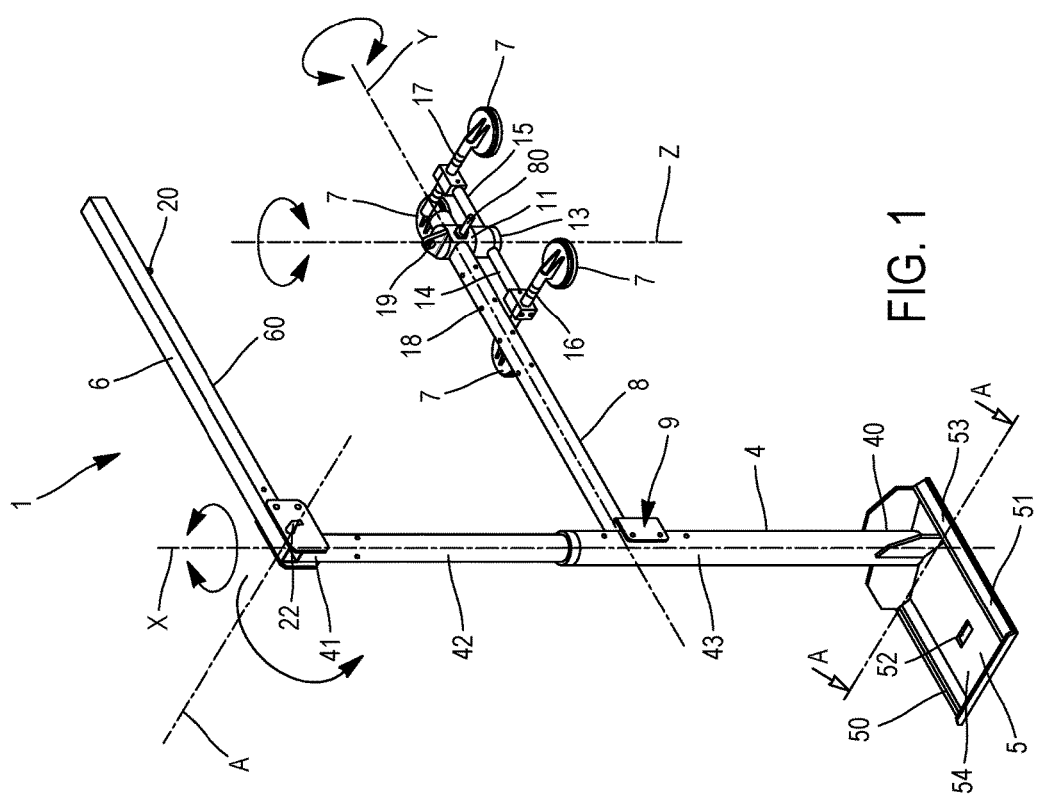
FIG. 2 shows a side elevation view of the device of FIG. 1, in which the set of suction cups is oriented toward the rotating beam.

Indeed, as shown in FIGS. 1 and 7, several series of four holes 18 extend in a stepped manner along the bar 8, whereas in each series, the holes 18 extend radially around the bar 8, and each time are spaced apart by a quarter revolution.

Thus, the sleeve 11 can be translated along the bar 8, as needed, to be positioned at a certain distance from the ends of the bar 8, at a series of four holes 18. Once this position is chosen, the operator still has the possibility of pivoting the sleeve 11 around the bar 8 before immobilizing it in one of the four positions determined by the four holes 18 of the selected series.

Furthermore, the sleeve 11 includes a branch 12, with an axis Z perpendicular to the axis Y of the bar 8, and on which a cylindrical stud 13 is mounted rotating by 360° around the axis Z. The latter can be blocked in different positions, for example using an indexing finger 81 cooperating with a hole 82 from a series of holes formed around the circumference of the branch 12. Furthermore, the cylindrical stud 13 bears a rod perpendicular to the axis of the stud 13, mounted rotating relative to the stud 13 around an axis Y1 parallel to the axis Y (arrows F1, F2) and the free ends of which form arms 14, 15 respectively bearing a pair of suction cups 7 each extending on either side of a rod 16, 17 perpendicular to the axis of the arms 14, 15.

Thus, the suction cups 7 supported by the bar 8 can be translated along the bar 8, following the translational movement of the sleeve 11, in particular in order to be placed on the bar 8 appropriately for the size of the window to be manipulated and the vehicle in question. Furthermore, they can be rotated by 360° around the axis Z of the branch 12, perpendicular to the axis Y of the bar 8, following the rotational movement of the cylindrical stud 13 (cf. arrow F0 in FIG. 3). They can also be rotated by 360° around the axis Y of the bar 8, following the rotational movement imparted to the T-shaped sleeve 11 by an operator (cf. arrow F1). Lastly, they can also pivot relative to the cylindrical stud 13 in one direction or the other around an axis Y1 parallel to the axis Y (arrows F1, F2). Furthermore, in order to be able to suspend the bar 8 from the beam 6, the invention is provided, in the alternative embodiment illustrated in FIGS. 1 to 5 and 7, to equip the sleeve 13 with an eyelet 19 extending in a plane parallel to the axis Z of its branch 12. To the same end, the lower face 60 of the beam 6 includes a hook 20 able to be connected to the eyelet 19 using a strap.

It should be noted that in the illustrated alternative embodiment, the hook 20 is secured to a carriage 21 (cf. FIG. 4) mounted translatably inside the beam 6, hollow in this case and preferably having a rectangular section, between two extreme positions provided with end-of-travel stops. The latter can for example be defined by the opposite ends of a slit formed on the lower face 60 of the beam 6 and through which the hook 20 is engaged when it is connected to the carriage 21.

Moreover, in the illustrated alternative embodiment, the post 4 is telescoping and includes an upper segment 42 arranged to slide relative to a lower segment 43, preferably using a jack 24 housed in the lower segment 43 and actuated by a motor connected to power supply means. The motor may preferably rotated at two rising speeds and two lowering speeds, so as to allow slowing during the terminal rising or lowering phases, and consequently an approach to within a millimeter of the desired position. It should be noted that such a feature also makes it possible to provide an adjustment of the height of the beam 6 relative to the bar 8 when the latter is secured to the post 4, as well as an adjustment of the height of the bar 8 relative to the ground, when it is suspended from the beam 6 using a strap and when it is separated from the post 4. This adjustment can preferably be done using a remote control that the operator can manipulate easily with one hand, while with the other he manipulates a window, but also by voice command, thus leaving both hands free.

Furthermore, with a view to storing the device 1 according to the invention, the beam 6 is mounted pivoting on the upper end 41 of the post 4, around an axis A perpendicular to the axis X of the post 4. Owing to such a structure, the beam 6 is movable between a deployed usage position, in which its axis is perpendicular to the axis X of the post 4, and a folded storage position in which its axis is parallel to that of the post 4 and it is situated against the latter above the part 54 of the plate 5.

Although for solidity reasons, the plate 5 preferably has a single-piece structure, it may if applicable be provided, with the same aim of reducing the bulk of the device 1 during storage thereof, that the plate 5 is either made in two segments 53, 54 including complementary nesting means, or connected by a hinge.

In reference to FIG. 1, in the illustrated alternative embodiment, the segments 53, 54 are nested. The post 4 is secured to the segment 53, while the segment 54 is intended, during the use of the device 1, to accommodate a vehicle 2 tire 3 and may include, if applicable, on an upper face 56, a plurality of raised patterns (not illustrated) to improve the contact between the plate 5 and the tire 3. In the usage position of the device 1 illustrated in the figures, the segments 53, 54 are nested and positioned in the same plane.

In the storage position of the device 1, the segment 54 can be separated from the segment 53, and for example placed in the vertical position against the lower end 40 of the post 4, in order to reduce its footprint. Furthermore, the segment 54 can advantageously be provided with an aperture 52 making it possible, during storage, to accommodate the free side wall 102 of the second platen 10 connected to the bar 8 as will be explained below, the segment 54 then remaining nested in the segment 53 and aligned with the latter (cf. FIG. 7).

To implement the device 1 according to the invention to assemble a window of a motor vehicle, for example a windshield, the technician responsible for the operations must first install the equipment. To that end, he positions the device 1, if applicable still situated in its storage position illustrated in FIG. 7, near a vehicle. He then releases the bar 8 bearing the suction cups 7 by removing the side wall 102 of the second platen 10 from the aperture 52 of the plate 5. He next pivots the beam 6 folded down against the post 4 toward its usage position, in which it is perpendicular to the post 4 and extends in a direction opposite that of the plate 5. The beam 6 is blocked in this position by appropriate means, and its height can be adjusted automatically owing to the actuation, preferably using a remote control, of the jack 24 allowing a precise adjustment of the length of the post 4 by selecting an appropriate approach speed at the end of travel.

The following phase consists of positioning the vehicle in question appropriately relative to the device 1 such that one of its tires bears on the segment 54 of the plate 5, between the beads 50a, 50b, and 51a, 51b, in order to block the device 1 solidly in place.

The operator next positions the suction cups 7 connected to the bar 8, having remained separated from the post 4 until then, on the outer face of a window, for example a windshield, that he is preparing to assemble on a vehicle and for example placed on a pallet in the immediate vicinity of the operation site. To that end, the suction cups 7 can be inclined appropriately by rotating the rod defining the arms 14, 15 around the axis Y1 or by rotating the sleeve 11 around the bar 8 and/or by rotating the sleeve 11 around the bar 8.

If applicable, the bar 8 is next secured to the beam 6, the height of which has been appropriately adjusted beforehand, using a strap connected both to the eyelet 19 and to the hook 20. The windshield can easily be manipulated easily and oriented suitably by the operator, its weight being borne at this stage by the support beam of the device 1.

Then, the technician separates the bar 8 on the post 4 by attaching the second platen 10 on the first platen 9. At this stage, he may optionally detach the strap connected to the hook 20 from the eyelet 19.

If necessary, he next places the four suction cups 7, causing them to be translated along the bar 8 and/or rotated around the axis of the bar 8, such that they extend between the bar 8 and the beam 6 (cf. FIG. 2) and at a suitable distance between the ends of the bar 8. If applicable, a ribbon of glue can then be affixed directly on the frame defining, on the vehicle, the opening in which the window must be mounted or on the perimeter of the inner face of said window.

To that end, in order to have access to the inside of the windshield, if necessary the operator turns the latter over, pivoting the suction cups 7 around the bar 8, after having removed the indexing finger 80 of the sleeve 11 from the orifice 18 in which it was inserted. When the appropriate position of the windshield is reached, the indexing finger is reinserted into another orifice 18 of the bar 8 to block the suction cups 7 in position relative to the latter. At this stage, the operator also has the possibility of placing the windshield in a position in which it is possible for him to deposit the ribbon of glue such that the connection between the two ends of the ribbon is situated on the lower edge of the windshield, which makes it possible to avoid any potential sealing problem after placement of the windshield. To that end, it suffices for him to pivot the suction cups 7 around the axis Z until the windshield is placed in a position in which its lower edge is substantially perpendicular to the axis Y of the bar 8 and is situated across from the post 4.

Next, after having deposited the ribbon of glue, the technician again turns the window over, the bar 8 still being secured to the post 4, by pivoting the suction cups 7 via the sleeve 11 around the axis Y of the bar 8, and/or via the cylindrical stud 13 around the axis Z perpendicular to the axis Y, until the window is positioned appropriately and the eyelet 19 of the sleeve 11 is easily accessible.

Using the strap connected again to the hook 20 and the eyelet 19 in the meanwhile, the technician next attaches the bar 8 on the beam 6, the height of which has been adjusted again beforehand, if applicable, to avoid needless effort for the technician. The latter next separates the bar 8 from the post 4.

Once released, the bar 8 bearing the window, and suspended from the beam 6 using the strap, is brought by the technician toward a direction in which it extends above the plate 5, by rotation of the beam 6 around the axis X of the post 4. The window is thus gradually guided until it is located above the opening of the vehicle in which it must be installed. During this phase, the orientation and positioning of the window are adapted along the way, if applicable by pivoting the suction cups 7 around two axes Y, Z, by moving the movable carriage 21 along the beam 6 and using the play allowed by the strap connecting the bar 8 to the beam 6.

Then, the bar 8 is lowered toward the opening of the vehicle by automatically adjusting the height of the post 4, therefore of the beam 6, using the jack 24. The window can be applied on the frame bordering said opening and fastened against the latter using the ribbon of glue previously deposited along the edge of the window or said frame.

The suction cups 7 are next separated from the outer face of the window, and the strap is removed from the eyelet 19. The technician can next store his equipment by placing the device 1 back in its storage position illustrated in FIG. 7. According to another alternative, it is also possible to store the bar 8 bearing the suction cups 7 independently from the post 4 supported by the plate 5. The latter can advantageously be disassembled when it is made up of two nesting segments 53, 54, or placed in the position in which the two segments 53, 54 form a right angle relative to one another, one of the segments being folded down against the post 4.

It should be noted that alternative embodiments other than those described above can be provided for the various component elements of the device according to the invention.

Figure 10:
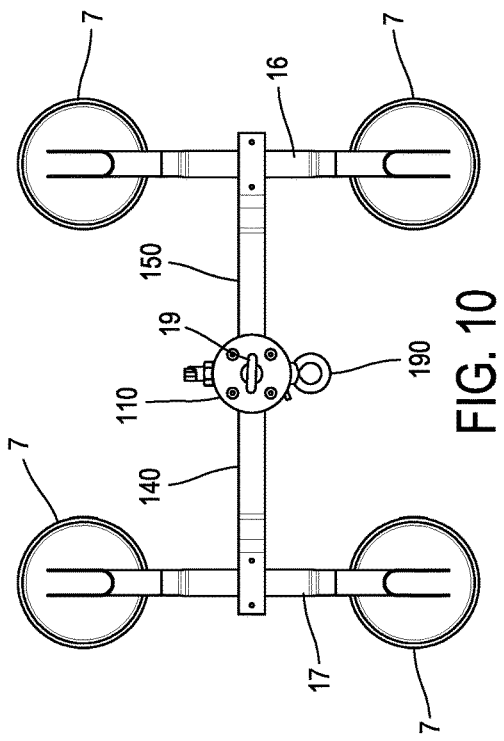
FIG. 10 is a top plan view of another alternative embodiment of the set of suction cups that the device according to the invention may include.
Figure 11:
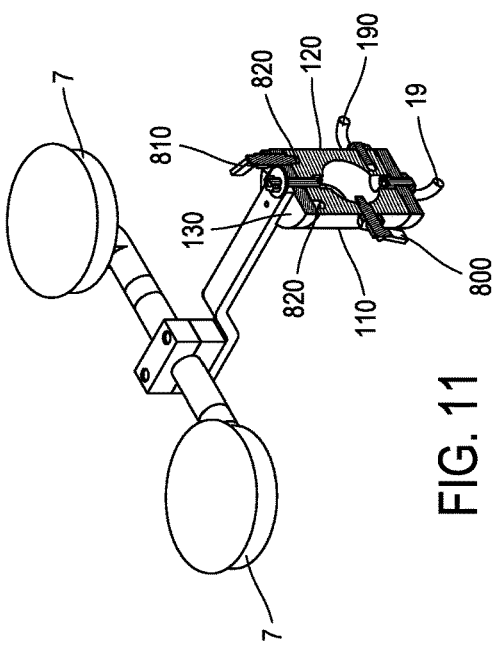
FIG. 11 is a partially sectional bottom view of the assembly illustrated in FIG. 10.

Thus, for example in the alternative embodiment illustrated in FIGS. 10 and 11, the suction cups 7 of the device 1 according to the invention are connected to the bar 8 using a sleeve 110 with axis Z perpendicular to the axis Y of the bar 8, mounted both rotating by 360° and translating around and along the axis Y, and able to be blocked in position relative to the bar 8, using an indexing finger 800 intended to cooperate with a hole chosen from among the plurality of holes 18 extending along and around the bar 8.

A disc 130 secured to the suction cups 7 is mounted rotating by 360° around the axis Z of the sleeve 110 and can be blocked in different positions, for example using an indexing finger 810 cooperating with a hole 820 from a series of holes with an axis parallel to the axis Z formed in a face of the sleeve 130 and distributed around the periphery of the latter. Furthermore, the disc 130 bears a flat iron extending perpendicularly to the axis of the sleeve 110, and the free ends of which form arms 140, 150 respectively bearing a pair of suction cups 7 each extending on either side of a rod 16, 17 perpendicular to the axis of the arms 140, 150.

Thus, similarly to what was described previously for the alternative embodiment illustrated in FIGS. 1 to 5 and 7, the suction cups 7 supported by the bar 8 can be translated along the bar 8, following the translational movement of the sleeve 110, in particular in order to be placed on the bar 8 appropriately for the size of the window to be manipulated and the vehicle in question. Furthermore, they can be rotated by 360° around the axis Z of the sleeve 110, perpendicular to the axis Y of the bar 8, following the rotational movement of the disc 130.

Furthermore, the sleeve 110 includes, on a face opposite that on which the disc 130 is mounted rotating, an eyelet 19, extending in a plane parallel to the axis Z, making it possible to secure the bar 8 with the beam 6 using a strap fastened to the hook 20 of the latter. The sleeve 110 includes an additional eyelet 190 extending in a plane perpendicular to the axis Z from its peripheral wall, and also making it possible to connect the bar 8 to the beam 6 using a strap. The presence of this eyelet 190 advantageously allows an operator to tilt the suction cups 7 as he wishes, without having to unlock means preventing its rotation beforehand.

I claim:

1. A device for placing and replacing a window of a motor vehicle, the device comprising:
    a support beam being comprised of a post having a lower end fastened on a base and an upper end secured to a beam rotating around an axis (X) of said post;
    a set of suction cups secured to a bar;
    means for suspending said bar from said beam;
    means for adjusting height of said bar suspended from said beam; and
    means for temporarily securing said bar to said post,
    wherein said suction cups are mounted rotating on said bar around an axis (Y) of said bar and around an axis (Z) perpendicular to said axis (Y) of said bar.

2. The device, according to claim 1, wherein the means for securing said bar to said post comprises a first U-shaped platen having a front wall and two side walls fastened to said post so as to arrange a space between said front wall and said post, and a second U-shaped platen having an upper wall and two side walls, wherein one side wall is fastened to one end of said bar, an inner face of the front wall of the first platen and a free side wall of the second platen being provided with complementary nesting means.

3. The device, according to claim 1, wherein said bar is comprised of a T-shaped sleeve mounted rotating around the axis (Y) of the bar, said T-shaped sleeve being comprised of a branch with axis (Z) on which a cylindrical stud is mounted rotating provided with two coaxial arms, perpendicular to the axis (Z) of the branch, each free end of the arms bearing a pair of suction cups, each pair extending on either side of the rod perpendicular to the axis of said arms.

4. The device, according to claim 3, wherein said T-shaped sleeve and said bar comprise means for translating said sleeve along said bar and blocking said sleeve in position in a given location.

5. The device, according to claim 3, wherein said means for suspending said bar from said beam comprises an eyelet secured to said T-shaped sleeve extending in the axis (Z) of said branch, a hook secured to a lower face of said beam and a strap connected to the hook and the eyelet.

6. The device, according to claim 5, wherein said hook is secured to a carriage translatable along said beam between two extreme positions defined by end-of-travel stops.

7. The device, according to claim 1, wherein said post is telescoping and further comprises an upper segment arranged to slide relative to a lower segment, and wherein said means for adjusting height of said bar suspended from said beam are defined by means for adjusting the position of said upper segment relative to said lower segment of said post.

8. The device, according to claim 7, wherein the adjusting means comprises a jack housed in said lower segment of said post and actuated using a motor connected to power supply means.

9. The device, according to claim 1, wherein said beam is mounted pivoting on the upper end of said post between a deployed usage position, and wherein an axis of said beam is perpendicular to the axis (X) of the post and parallel to the axis (X) of the post in a folded storage position.

10. The device, according to claim 1, wherein said base is defined by a plate having two opposite edges and being comprised of means for wedging a motor vehicle tire.

11. The device, according to claim 10, wherein said plate is comprised of two parts arranged to adopt a deployed usage position relative to one another in which they are situated in the same plane and a folded storage position in which they form a right angle relative to one another.

\* \* \* \* \*